United States Patent [19]

Yotsuyanagi et al.

[11] 4,073,756
[45] Feb. 14, 1978

[54] SOLID ADHESIVE COMPOSITIONS

[75] Inventors: Yoshihiko Yotsuyanagi, Kobe; Naganori Araki, Sakai; Shigeru Nagasawa, Ageo; Toshinao Okitsu, Tokyo, all of Japan

[73] Assignee: Konishi Co., Ltd., Osaka, Japan

[21] Appl. No.: 680,392

[22] Filed: Apr. 26, 1976

[51] Int. Cl.$^2$ ............................................. C08L 91/00
[52] U.S. Cl. .............................. 260/18 N; 106/170; 106/211; 260/23 AR; 260/23 R; 260/29.6 ME; 260/29.6 MN
[58] Field of Search ... 260/18 N, 29.6 MN, 29.6 ME, 260/23 AR, 23 R; 106/211, 170

[56] References Cited

U.S. PATENT DOCUMENTS

| | | | |
|---|---|---|---|
| 3,159,606 | 12/1964 | Sims et al. | 260/18 N X |
| 3,576,776 | 4/1971 | Muszik et al. | 260/18 R X |
| 3,663,459 | 5/1972 | Yoshida et al. | 252/546 |
| 3,669,911 | 6/1972 | Najvar | 260/29.6 ME X |
| 3,964,832 | 6/1976 | Cohen et al. | 260/23 R X |

*Primary Examiner*—Sandra M. Person
*Attorney, Agent, or Firm*—Sughrue, Rothwell, Mion, Zinn and Macpeak

[57] ABSTRACT

An adhesive composition which is in a wax-like or jelly-like state at room temperature comprising:
(a) an N-fatty acid acylated amino acid or an alkali metal salt, ammonium salt or amine salt of the acid;
(b) a compound having in its molecule a polyoxyalkylene structure containing at least four oxyalkylene units;
(c) a water soluble or water dispersible polymer having adhesive properties; and
(d) water or a mixture of water and one or more organic solvent(s) and/or one or more plasticizer(s).

24 Claims, No Drawings

SOLID ADHESIVE COMPOSITIONS

BACKGROUND OF THE INVENTION

1. Field of the Invention

The present invention relates to an adhesive composition which is in a wax-like or jelly-like state at room temperature.

2. Description of the Prior Art

An adhesive of the type that is inserted in a container in the solid state, pushed out of the container for use, spread over adherend surfaces, and then the remainder re-inserted in the container for subsequent use is generally known as a solid adhesive.

In such a solid adhesive, it is required to blend a gelling agent in a binary composition system comprising an adhesive component and a solvent, and as such gelling agents there are alkali metal salts or ammonium salts of fatty acids as described in U.S. Pat. No. 3,576,776 and benzalsorbitols as described in Japanese Patent Application (OPI) 29,434/72. However, the use of the fatty acid salts or fatty acid soaps described in the aforesaid U.S. Patent as a gelling agent is accompanied by problems, e.g., the adhesive composition produced usually shows high alkalinity (about 10 pH), which creates a safety problem when it is handled by school children, etc., as well as it takes a long time to produce the adhesive composition and the viscosity of the adhesive composition is high (e.g., higher than 150,000 cps), which makes it difficult to fill the adhesive composition in containers.

When the benzalsorbitols disclosed in the aforesaid Japanese Patent Application are used as the gelling agent, it is necessary to use a comparatively large amount of a low boiling point organic solvent such as an alcohol as the solvent for the production of the adhesive since the benzalsorbitols are insoluble or sparingly soluble in water, and, hence, the adhesive composition obtained has the essential fault that the solvent volatilizes during storage or use of the adhesive composition even at room temperature, as well as the fact that the vapor of the solvent volatilized is harmful to humans.

SUMMARY OF THE INVENTION

One object of this invention is, therefore, to provide a solid adhesive composition the viscosity and the gelling time of which can be easily controlled and which is excellent in coatability, adhesive properties, and shape stability upon use.

A more particular object of this invention is to provide a stick shaped adhesive which is free of the above described defects of the conventional adhesive compositions and which is excellent in coatability, adhesive properties, and shape stability as well as which can be easily inserted in filling means, containers, etc., or can be simply shaped into any desired form without the need for complicated operations since the viscosity of the adhesive in sol-state upon heating and the gelling time thereof can easily be controlled.

It has now been discovered that the objects of this invention can be attained by blending a compound having a polyoxyalkylene structure in its molecule with a solid adhesive composition containing an N-fatty acid acylated amino acid or a salt thereof as a gelling agent, that is, the adhesive compositions of this invention comprise:

(a) an N-fatty acid acylated amino acid or a salt thereof;

(b) a compound having in its molecule a polyoxyalkylene structure containing at least four oxyalkylene units;

(c) a water soluble or water dispersible polymer having adhesive properties; and (d) water or a mixture of water and one or more organic solvent(s) and/or one or more plasticizer(s).

DETAILED DESCRIPTION OF THE INVENTION

The adhesive compositions of this invention possess the following features:

(1) Since the compound having a polyoxyalkylene structure in its molecule synergistically interacts with the N-fatty acid acylated amino acid or a salt thereof to further improve gelling capability, the adhesive composition has such excellent coatability that it can be smoothly spread on the adherend surface of a paper to give a homogeneous adhesive coating by lightly rubbing the paper surface with the adhesive, and also has such excellent shape stability that in the case of strongly rubbing adherend surfaces with the adhesive, there is no fear of causing a collapse or deformation of the adhesive.

(2) Since the compound having a polyoxyalkylene structure in its molecule is excellent in permeability and wettability, it quickly permeates into adherend articles to well wet the surfaces thereof, which results in improving the wettability of the adhesive composition and thus remarkably increasing the initial bonding speed and the bonding strength, as well as avoiding inferior adhesion.

(3) Since the adhesive composition of this invention does not require an organic solvent such as an alcohol, etc., the adhesive composition is highly safe and odorless. Further, since the compound having a polyoxyalkylene structure in its molecule has a high moisture retention capability, the adhesive composition of this invention shows low volatilization loss of the components thereof and thus can be stored in a stable fashion for long periods of time.

(4) Since the viscosity of the adhesive composition in sol-state upon heating and the gelling time thereof can be controlled without reducing the original adhesive properties thereof, the adhesive composition can be easily shaped into any desired form such as stick, etc., according to the shapes of filling means, containers, etc.

The N-fatty acid acylated amino acid used in this invention as a gelling agent is an N-alkanoylamino acid or an N-alkenoylamino acid, the amino group of the amino acid of which has been acylated by the carboxyl group of the fatty acid, or further a mixture of these acylated amino acids, and, as the fatty acid, saturated or unsaturated fatty acids having 7 to 23 carbon atoms can be used individually or as a combination thereof. The amino acid moiety of the N-fatty acid acylated amino acid preferably has 2 to 10 carbon atoms.

Typical examples of the fatty acid used in this invention are enanthic acid, coconut oil fatty acid, lauric acid, myristic acid, palmitic acid, stearic acid, behenic acid, and oleic acid. Among these fatty acids, saturated fatty acids are particularly preferred in this invention.

Examples of the amino acid bonded to the aforementioned fatty acid are, for example, neutral amino acids such as glycine, N-methylglycine, alanine, such as a α-alanine, β-alanine, N-methylalanine, valine, leucine, isoleucine, serine, theronine, etc., and acid amino acids such as glutamic acid, aspartic acid, hydroxyglutomic acid, etc. In particular, while aliphatic amino acids such as the aforesaid acid amino acids are preferably used, aromatic amino acids, e.g., phenylalanine, tyrosine, o-, m-, or p-aminobenzoic acid, etc., may also be used in this invention. Furthermore, the amino acid bonded to the fatty acid may form a salt by neutralizing one or more free acid groups of the amino acid with one or more alkalis, for example, an alkali metal such as sodium, potassium, lithium, etc., an alkanolamine such as triethanolamine, etc., an alkylamine such as ethylamine, etc., and ammonium. Among these salts, monoalkali metal salts are preferred.

Examples of such neutralized fatty acid acylated amino acids are mono-sodium and di-sodium N-stearoylglutamates. Most preferred examples of the N-fatty acid acylated amino acids used in this invention are those consisting of a saturated fatty acid moeity having 14 to 18 carbon atoms, e.g., myristic acid, palmitic acid, stearic acid, etc., and an amino acid moiety, i.e., aminodicarboxylic acid, e.g., aspartic acid, glutamic acid, etc., such as N-myristoylaspartic acid, N-palmitoylaspartic acid, N-stearoylaspartic acid, N-myristoylglutamic acid, N-palmitoylglutamic acid, N-stearoylglutamic acid, and the alkali metal salts of these acids.

Of the gelling agents used in this invention, free N-fatty acid acylated amino acids are most preferred, and mono alkali metal salts thereof such as the mono-sodium, mono-potassium, or mono-lithium salt are preferred, although di-alkali metal salts or mono- or di-alkali salts such as di-ammonium salts, di-amine salts, etc., can also be used.

The gelling agents used in this invention have the following features.

(1) Since the gelling agent shows a remarkable gelling function using a solvent composition mainly comprising water, the adhesive composition prepared by blending the gelling agent can be easily and smoothly applied to papers, etc., simply by lightly rubbing the papers with the adhesive composition to provide a homogeneous coating of the adhesive composition, and, further, the shaped adhesive compositions such as sticks, etc., are not deformed when adherend surfaces are rubbed strongly with these adhesives. In particular, the gelling power is excellent in the range of the neutral state to the acid state, particularly, in the range of pH about 2 to 7, preferably about 2 to about 5.

(2) Since the gelling agent itself does not possess a stimulative activity or allergenic activity on skin, etc., the adhesive composition prepared by blending the gelling agent can be handled safely.

(3) Since the use of organic solvents such as alcohols, etc., is unnecessary in the case of blending the gelling agent, adhesives which give less solvent odor, less reduction in coating properties and adhesive properties, and less harmful influence on humans due to the volatilization of the organic solvent are obtained.

(4) The transparency of the adhesive compositions obtained using the gelling agents of this invention is superior to those prepared using conventional alkali salts of fatty acids as gelling agent.

The proportion of the N-fatty acid acylated amino acid(s) and/or the salt(s) thereof used as the gelling agent(s) in the adhesive composition of the invention is about 2 to about 30% by weight, preferably about 4 to 20% by weight, of the total amount of the adhesive composition.

The aforesaid N-fatty acid acylated amino acids can be obtained by reacting fatty acids or derivatives thereof with amino acids as described in, for example, *Journal of American Oil Chemists' Society*, 49, 143 (1972) and ibid., 49, 157 (1972) or may further be prepared by the method described in U.S. Pat. No. 3,663,459.

As the compound having a polyoxyalkylene structure in its molecule used in this invention, there are compounds having in the molecule thereof a polyoxyalkylene structure represented by the following formula:

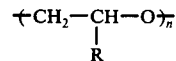

where $n$ is a positive integer of 4 to 2,000 and R represents a hydrogen atom or an alkyl group having 1 to 6 carbon atoms. In this invention oxyethylene bonds, oxypropylene bonds, oxybutylene bonds, etc., are preferred. Most preferred examples are oxyethylene and oxypropylene bonds; they may be used individually or as a combination of two or more of such compounds.

Examples of compounds having such an oxyalkylene structure are polyoxypropylene glycol; an alkyl ether of polyoxypropylene glycol, the alkyl having 1 to 5 carbon atoms; a fatty acid ester of polyoxypropylene glycol, the fatty acid having 1 to 3 carbon atoms; a random or block copolymer having oxyethylene units and oxypropylene units (mean molecular weight: about 1,000 to about 10,000; oxyethylene units: oxypropylene units = about 5 to about 85: about 95 to about 15 wt% based on the total weight of the copolymer) such as polyoxyethylene glycol polyoxypropylene glycol ether; an alkyl ether of such a block copolymer, the alkyl group having 1 to 5 carbon atoms; a fatty acid ester of such a block copolymer, the fatty acid having 1 to 3 carbon atoms; polyethylene glycol; an alkyl ether of polyethylene glycol, the alkyl having 12 to 18 carbon atoms; an alkylphenyl ether of polyethylene glycol, the alkyl having 8 to 12 carbon atoms; and a fatty acid ester of polyethylene glycol, the fatty acid having 12 to 18 carbon atoms. The compounds having the polyoxyalkylene structure in its molecule used in this invention usually possess a mean molecular weight of about 200 to about 100,000, preferably 200 to 10,000.

Specific examples of the aforementioned compounds are polyoxypropylene glycol, polyoxypropylene glycol butyl ether, polypropylene glycol polyethylene glycol ether, polyethylene glycol lauryl ether, polyethylene glycol octadecyl ether, polyethylene glycol nonylphenyl ether, polyethylene glycol laurate, the laurate of polyoxyethylene sorbitan ether, etc. Among these compounds, polyoxypropylene glycol having a mean molecular weight of 200 to 1,000 and polypropylene glycol polyethylene glycol ether having a mean molecular weight of 1,000 to 5,000 are particularly preferred.

The proportion of the compound having the polyoxyalkylene structure in its molecule used in this invention with desired effects is usually about 2 to about 30% by weight, preferably 4 to 20% by weight, of the total amount of the adhesive composition.

In this invention, it is necessary to use one or more of the aforementioned compounds having the polyoxyalkylene structure in its molecule; by employing the compound(s), the viscosity of the adhesive composition upon reaching sol-state by heating and also the gelling time thereof can be controlled. When the viscosity of a conventional stick shape adhesive in sol-state by heating is controlled or the gelling time is controlled, it is necessary to greatly change the amount of the adhesive components or the amount of the gelling agent, and, thus, the stick shaped adhesive becomes too hard or becomes hard to coat, which results in reducing the original adhesive properties of the adhesive. On the other hand, in the present invention, the aforementioned control can easily be practiced by slightly changing the kind and amount of the compound having the polyoxyalkylene structure in its molecule or by slightly changing the proportions of a hydrophobic group such as an oxypropylene group and a hydrophilic group such as an oxyethylene group in the same molecule or two components having each group without changing the excellent properties of the adhesive composition.

In this invention, a water soluble or water dispersible polymer having adhesive properties is used as the adhesive component. Various known natural, semi-synthetic, or synthetic polymers may be used as such polymers. Polymers having a mean molecular weight of about 5,000 to about 2,000,000 preferably 10,000 to 1,500,000 are generally used in this invention.

As the water soluble or water dispersible polymer having adhesive properties those polymers having a carboxyl group or carboxylic anhydride group are most effective for achieving good interaction with the gelling agent used in this invention. Of these, those polymers having a higher acidity than that of the gelling agent are preferred. However, polymers being free of carboxyl groups and/or carboxylic anhydride groups can also be used.

Typical examples of the synthetic polymer are copolymers or homopolymers having a carboxyl group or a carboxylic anhydride group, where the proportions of the carboxyl and/or carboxylic anhydride group containing monomer is preferably about 10 to 100 mol%, more preferably about 30 to 100 mol%, based on the total mols of monomer(s) used (e.g., a copolymer of vinyl methyl ether and maleic anhydride, a copolymer of isobutylene and maleic anhydride, polyacrylic acid, polymethacrylic acid, a copolymer of styrene and acrylic acid, a copolymer of ethylene and acrylic acid, etc.), a copolymer of vinyl pyrrolidone and vinyl acetate, polyvinyl acetate, polyvinyl methyl ether, polyvinyl pyrrolidone, polyvinyl alcohol, etc. Examples of the semi-synthetic polymers used in this invention are cellulose derivatives such as methyl cellulose, ethyl cellulose, carboxymethyl cellulose, hydroxymethyl cellulose, etc., and starch derivatives such as carboxymethyl starch, etc. Examples of natural polymers used in this invention are starch, dextrin, etc. These polymers are required to have adhesive proeprties and to be water soluble or water dispersible.

Particularly preferred examples of the polymers used for the purpose are polymers having a carboxyl group or carboxylic anhydride group, such as a copolymer of vinyl methyl ether and maleic anhydride, in particular, having a mean molecular weight of 50,000 to 1,300,000, polyacrylic acid, in particular, having a mean molecular weight of 10,000 to 300,000, a copolymer of isobutylene and maleic anhydride, in particular, having a mean molecular weight of 10,000 to 300,000, etc. Also, when the polymer used is alkaline or neutral, a mineral acid such as hydrochloric acid, etc., or an organic acid may be, if desired, used in an amount of 0 to about 40% by weight in the adhesive composition. Preferred examples of the organic acid are hydroxycarboxylic acids such as citric acid, lactic acid, tartaric acid, etc. Furthermore, in this invention, the aforementioned adhesive polymer may be used together with a tacky resin such as rosin, a phenol resin, an alkyd resin, etc., for increasing the tackiness of the adhesive composition.

The proportion of the aforesaid adhesive component or polymer blended in the adhesive composition of this invention is generally about 5 to about 50% by weight, preferably about 15 to 35% by weight, of the total amount of the adhesive composition.

In the present invention, water or a mixture of water and an organic solvent is used as the solvent. When water only is used as the solvent, sufficient effects can be obtained in this invention, but to further improve transparency, coating capability, etc., of the adhesive compositions of this invention, an organic solvent or a plasticizer may be used together with water. (Examples of the organic solvent used in this invention thus include ones which can be used as a plasticizer as well as a solvent.) As the organic solvent hydrophilic solvents are preferred. In this case, it is preferred that the amount of the organic solvent or the plasticizer used together with water be up to but not more than the amount of the water (by weight). Examples of these organic solvents and plasticizers are monohydric alcohols such as ethanol, isobutanol, etc., ethylene glycol, glycerol, hexylene glycol, mono-, di-, or tri-ethylene glycol mono-butyl ether, mono-, di, or tri-ethylene glycol dibutyl ether, mono-, di-, or tri-ethylene glycol mono-methyl ether, mono-, di-, or tri-ethylene glycol di-methyl ether, mono-, di-, or tri-ethylene glycol mono-ethyl ether, mono-, di-, or tri-ethylene glycol di-ethyl ether, mono-, di-, or tri-ethylene glycol mono-phenyl ether, mono-, di-, or tri-ethylene glycol di-phenyl ether, mono-, di-, or tri-ethylene glycol mono-butyl ether acetate, propylene glycol monomethyl ether, the acetyl trialkyl citrates shown by the following general formula:

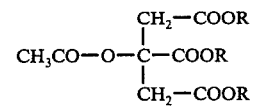

(wherein R is an alkyl group having 1 to 8 carbon atoms), glycerol triacetate, a condensation product of adipic acid and ethylene glycol (molar ratio 1:1), and cyclohexanone. Preferred examples of the organic solvents employed in this invention are mono- or di-ethylene glycol monobutyl ether, mono-, di- or triethylene glycol mono-phenyl ether, and mono- or di-ethylene glycol mono-butyl ether acetate.

Of the above described compounds, ethanol, isobutanol, cyclohexanone, etc., are used only as a solvent, whereas acetyl trialkyl citrates, glycerol triacetate, the condensation product of adipic acid, etc., are employed only as a plasticizer. The remaining compounds may be used both as a solvent and as a plasticizer.

The proportion of the organic solvent or plasticizer used in this invention is up to about 40% by weight of the adhesive composition since the proportion of the total solvents used in the adhesive composition of this invention is about 30 to about 80% by weight, preferably about 40 to about 70%, of the total adhesive composition, but the proportion is required to be less than the amount of water used together therewith.

The solid adhesive component of this invention may further contain dyes, pigments, perfumes, perfumed oils, etc., in an amount of about 0.01 to about 10% by weight based on the adhesive composition, to improve the appearance and odor thereof in addition to the aforesaid components (a), (b), (c) and (d).

The solid adhesive compositions of this invention may be prepared in a conventional manner. For example, a mixture of the above described components can be placed in a vessel equipped with a stirrer, heated to 70° to 90° C and the mixture thus obtained poured into another vessel in the hot state followed by cooling. In the preparation of the adhesive composition of this invention, by properly selecting the kind, combination, and amount of the compound having the polyoxyalkylene structure in its molecule to be added to the aforesaid mixture, a solid adhesive composition which can be easily shaped into a form fitting to the faculty and the structure of a filling means, the structure of the cooling system, and the structure of the desired container can be obtained in a short period of time without reducing the desired adhesive properties.

The solid adhesive composition thus prepared has a pH value of about 2 to about 7, preferably about 2 to about 5, which can be easily handled without being accompanied by the problems in conventional solid adhesives, is excellent in shape stability at use, can be easily and uniformly spread over the adherend surfaces of papers, etc., at coating, and shows excellent adhesive properties. Thus, the adhesive compositions of this invention are useful as adhesives in general offices, schools, homes, engineering, in general industry, etc.

The invention will further be illustrated in detail by the following examples.

EXAMPLE 1

Into a 200 ml 4-necked flask equipped with a stirrer, a reflux condenser, and a thermometer were charged 57.0 g of water and 10.0 g of Pluronic L-64 (trade name of a polypropylene glycol polyethylene glycol ether having a mean molecular weight of 2,900; the weight of ethylene oxide added in the whole molecule being 40 wt% and the mean molecular weight of the hydrophobic group or the polypropylene glycol group being 1,750), and, after further adding to the mixture 25.0 g of a 1:1 molar copolymer of vinyl methyl ether and maleic anhydride having a mean molecular weight of 250,000 (hereinafter referred to as "PVM/MA" for brevity) and 8.0 g of N-stearoylglutamic acid with stirring, the resultant mixture was heated to 80° C. The mixture was further stirred for one hour at 80° C to provide a homogeneous starch-like mixed solution. The product was poured into a lipstick type container having a capacity of 5 ml and then allowed to cool to room temperature, whereby the product gelled after 5 minutes. In addition, the pH of the adhesive obtained was 3.6.

When the stick shaped adhesive thus formed was forced out of the container by about 3 mm and a kraft paper was strongly or lightly rubbed with the adhesive, it was smoothly spread thereover without cobwebbing to form a continuous thin coating of the adhesive. The stick was also not deformed. Then, to test the adhesive strength, the surface of a kraft paper was rubbed with the adhesive stick, another kraft paper was superposed on the adhesive coated kraft paper, and the adhesive bearing area of the laminate lightly pressed by a finger, whereupon a stop watch was started. After 20 seconds, the kraft papers were separated to result in tearing of the paper, which indicated excellent initial adhesive strength. In addition, when a conventional adhesive was prepared using polyvinyl pyrrolidone as the adhesive component and a fatty acid soap as the gelling agent in the same procedure as above, it took more than 40 seconds to cause tearing of the paper in case of separating a laminate of kraft papers after bonding them as above.

Furthermore, by repeating the procedure above, a number of laminated samples of kraft papers were prepared and they were subjected to the separation test after 2 minutes, 1 hour, 1 day, 1 week, and 1 month. The paper was torn in each case, which showed good adherence.

Furthermore, when the test of initial bonding strength was carried out in the same manner as above using commercially available envelopes, commercially available reporting papers, etc., the paper was torn after 20 to 30 seconds in each case, and also it was confirmed that the bonding strength was sufficient after the bonded assemblies of the papers were stored for a long period of time.

In addition, when several adhesive sticks contained in closed containers were placed in an incubator for 1 month at 50° C to test their storage capability, the loss due to volatilization of the adhesives was confirmed to be 0 to 0.2% by weight of the amount of the adhesives.

EXAMPLE 2

Into a three liter four-necked stainless steel flask equipped with a stirrer, a reflux condenser, and a thermometer were charged 1,020 g of water and 240 g of Pluronic L-61 (trade name of the polypropylene glycol polyethylene glycol ether having a mean molecular weight of 2,000 (the weight of ethylene oxide added in the whole molecule being 10 wt% and the mean molecular weight of the hydrophobic group or the polypropylene glycol group being 1,750)), and, after adding thereto 540 g of a 1:1 molar copolymer of vinyl methyl ether and maleic anhydride having a mean molecular weight of 250,000 and 200 g of mono-sodium N-stearoylglutamate, the mixture was heated to 75° C and further stirred for about 3 hours at 75° C to provide a homogeneous milk-white mixed liquid. The pH of the mixed liquid was 3.8. The stirring was then stopped and the product allowed to cool naturally to room temperature to provide a solid adhesive. When the solid adhesive was spread onto the surface of a commercially available reporting paper by means of a spatula, the adhesive could be coated smoothly without cobwebbing to yield a continuous thin coating of the adhesive. The results of testing the bonding strength of the adhesive coating in the same manner as in Example 1 showed that bonding strength was sufficient.

Then, a part of the solid adhesive thus prepared was placed in a 500 ml flask, heated to 70° C with stirring by means of a glass rod to re-melt the same, and poured into a commercially available 5 ml lipstick type container. When the molten adhesive was allowed to naturally cool to room temperature, it gelled after 20 minutes. When the adhesive stick thus formed was forced out of the container by 2 to 3 mm and a kraft paper was strongly or weakly rubbed with the adhesive, the adhesive could be smoothly spread thereover without cobwebbing to form a continuous thin coating of the adhesive. Further, the stick was also not deformed. When the same bonding strength test as in Example 1 was carried out, results the same as in Example 1 were obtained.

Also, in a rebinding test for corrugated fiber boards which requires strong initial bonding strength and high bonding speed, the rebinding resistance adhesive property of a double faced corrugated fiberboard of a jute liner (10 cm × 5 cm) upon double-folding in the lengthwise direction was good. That is, the folded fiberboard was fixed by pressing for 20 seconds and when the fiberboard was separated, the jute liner was torn and scuffing formed. In addition, when double-faced corrugated fiberboards prepared using conventional adhesives were subjected to the same test as above, they were not fixed by pressing for more than one minute and, at separation, little scuffing resulted.

EXAMPLE 3

Into a 200 ml four-necked flask equipped with a stirrer, a reflux condenser, and a thermometer were charged 60 g of water and 5.0 g of polyoxypropylene glycol having a mean molecular weight of 400, and, after adding thereto 30.0 g of a 1:1 molar copolymer of vinyl methyl ether and maleic anhydride having a mean molecular weight of 250,000 and 5.0 g of N-stearoyl-glutamic acid with stirring, the resultant mixture was heated to 70° C and stirred for 1 hour at 70° C to provide a homogeneous, translucent mixed liquid. The pH of the product was 3.8. The liquid was poured into a lipstick type container and then allowed to naturally cool to room temperature, whereby the product gelled after 10 minutes. When the adhesive stick thus formed was tested for the coating properties, the shape stability, the adhesive properties and anti-volatilization capability upon storage as in Example 1, the results obtained were almost the same as those in Example 1.

EXAMPLE 4

Into 200 ml four-necked flask equipped with a stirrer, a reflux condenser, and a thermometer were charged 50.0 g of water and 12.0 g of Pluronic L-61 (see Table 1), and, after adding thereto 26.0 g of a 1:1 molar copolymer of vinyl methyl ether and maleic anhydride having a mean molecular weight of 250,000 and 12.0 g of mono-sodium N-palmitoylaspartate, the resultant mixture was heated to 80° C and stirred for about 3 hours at 80° C to provide a homogeneous mixture. The mixture was packed in a lipstick type container and allowed to naturally cool to room temperature to provide an adhesive stick. The pH of the adhesive was 4.0. The adhesive stick thus formed also had sufficient coating properties, shape stability, and adhesive properties.

EXAMPLE 5

Into a 200 ml four-necked flask equipped with a stirrer, a reflux condenser, and a thermometer were charged 28.0 g of an isobutylene/maleic anhydride copolymer (1:1 mol ratio; mean molecular weight of 90,000), 38.0 g of water, 9.0 g of ethylene glycol monobutyl ether, and 9.0 g of 25 wt% aqueous ammonia followed by heating to dissolve the components, and, after adding to the solution 5.0 g of Pluronic L-64 (see Table 1) and 11.0 g of mono-sodium N-stearoylglutamate with stirring at 40° C, the resultant mixture was heated to 80° C and then stirred for 2 hours at 80° C. The mixture thus obtained was poured into a lipstick type container and allowed to naturally cool to room temperature to provide an adhesive stick. The adhesive thus obtained also had excellent coating properties, shape stability, and adhesive properties sufficient for practical purposes.

EXAMPLE 6

Adhesive mixtures A, B, C, D, and E having the compositions as shown in Table 1 were prepared following the same procedure as in Example 1.

TABLE 1

| Component | Blended Amounts (weight parts) | | | | |
|---|---|---|---|---|---|
| | A | B | C | D | E |
| Pluronic L-64* | 120 | 100 | 80 | 40 | 0 |
| Pluronic L-61** | 0 | 0 | 0 | 60 | 120 |
| Mono-sodium N-stearoyl-glutamate | 100 | 100 | 100 | 100 | 100 |
| PVM/MA*** | 250 | 250 | 250 | 250 | 250 |
| Water | 530 | 550 | 570 | 550 | 530 |

*Polypropylene glycol polyethylene glycol ether having a mean molecular weight of 2,900, containing 40 wt% ethylene oxide, and having a mean molecular weight of the polypropylene glycol hydrophobic group of 1,750.
**Polypropylene glycol polyethylene glycol ether having a mean molecular weight of 2,000, containing 10 wt% ethylene oxide, and having a mean molecular weight of the hydrophobic group of 1,750.
***Copolymer of vinyl methyl ether and maleic anhydride, 1:1 by mol ratio, mean molecular weight of 250,000.

Each of the adhesive mixtures thus prepared was placed in a 1 liter beaker, and, while maintaining the mixture at 70° C, the viscosity of the mixture was measured by means of a Brookfield viscometer. Then, a part of the mixture at the same temperature was placed in a test tube of 18 mm diameter and the period of time required until the mixture was provided with shape retentivity at room temperature (20° C) and a humidity of 60% was measured. The results obtained are shown in Table 2.

TABLE 2

| Test Sample | Viscosity (cps) | Gelling Time (min) |
|---|---|---|
| Mixture A | 17,000 | 35 |
| Mixture B | 8,000 | 15 |
| Mixture C | 4,800 | 8 |
| Mixture D | 2,200 | 15 |
| Mixture E | 1,000 | 30 |

From the results shown in Table 2, it will be understood that as the weight of ethylene oxide added is increased and the amount of the compound having a polyoxyalkylene structure in its molecule is increased, the viscosity of the product becomes higher, and that by changing the kind and the amount of the compound having the polyoxyalkylene structure in its molecule, the viscosity of the adhesive composition prepared can be controlled without changing the kind of the adhesive component or the amount of the gelling agent.

Furthermore, the adhesive sticks of the adhesive mixtures had almost the same coating properties, shape rententivity, and adhesive properties as in Example 1.

While the invention has been described in detail and with reference to specific embodiments thereof, it will be apparent to one skilled in the art that various changes and modifications can be made therein without departing from the spirit and scope thereof.

What is claimed is:
1. An adhesive composition comprising:
(a) an N-fatty acid acylated amino acid or a salt thereof in an amount of about 2 to 30% by weight of the total amount of the adhesive composition;
(b) a compound having in its molecule a polyoxyalkylene structure containing at least four oxyalkyl- ene units in an amount of about 2 to 30% by weight of the total of the adhesive composition;

(c) a water soluble or water dispersible polymer having adhesive properties in an amount of about 5 to 50% by weight of the total amount of the adhesive composition; and (d) water or a mixture of water and one or more organic solvent(s) and/or one or more plasticizer(s), wherein the total amount of component (d) is about 30 to about 80% by weight of the total adhesive composition, but wherein the proportion of the one or more organic solvent(s) and/or one or more plasticizer(s) is less than the amount of water used together therewith.

2. The adhesive composition as claimed in claim 1, wherein said N-fatty acid acylated amino acid is an N-alkanoylamino acid, said alkanoyl group having 7 to 23 carbon atoms, an N-alkenoylamino acid, said alkenoyl group having 7 to 23 carbon atoms, or a mixture of said acids.

3. The adhesive composition as claimed in claim 1, wherein the amino acid moiety of the N-fatty acid acylated amino acid has 2 to 10 carbon atoms.

4. The adhesive composition as claimed in claim 1, wherein said compound having in its molecule a polyoxyalkylene structure containing at least four oxyalkylene units is represented by the following formula:

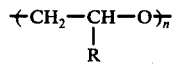

wherein $n$ is a positive integer of 4 to 2,000 and R represents a hydrogen atom or an alkyl group having 1 to 6 carbon atoms.

5. The adhesive composition as claimed in claim 1, wherein the amino acid of said N-fatty acid acylated amino acid is a neutral or acid aliphatic amino acid.

6. The adhesive composition ad claimed in claim 1, wherein said N-fatty acid acylated amino acid consists essentially of an N-alkanoylamino acid, said alkanoyl group having 7 to 23 carbon atoms.

7. The adhesive composition as claimed in claim 1, wherein said compound having a polyoxyalkylene structure in its molecule is polyoxypropylene glycol, a polyoxypropylene alkyl ether, said alkyl group having 1 to 5 carbon atoms, a polyoxypropylene glycol fatty acid ester, said fatty acid having 1 to 3 carbon atoms, a random copolymer having oxyethylene units and oxypropylene units, a block copolymer having oxyethylene units and oxypropylene units, an alkyl ether of the aforesaid copolymers, said alkyl group having 1 to 5 carbon atoms, a fatty acid ester of the aforesaid copolymers, said fatty acid having 1 to 3 carbon atoms, polyethylene glycol, a polyethylene glycol alkyl ether, said alkyl group having 12 to 18 carbon atoms, a polyethylene glycol alkylphenyl ether, said alkyl group having 8 to 12 carbon atoms, or a polyethylene glycol fatty acid ester, said fatty acid having 12 to 18 carbon atoms.

8. The adhesive composition as claimed in claim 7, wherein said block copolymer having oxyethylene units and oxypropylene units has a means molecular weight of from about 1,000 to about 10,000 and comprises oxyethylene units : oxypropylene units at a ratio of from about 5 to about 85 : about 95 to about 15 wt%, based on the total weight of the copolymer.

9. The adhesive composition as claimed in claim 1, wherein said water soluble or water dispersible polymer having adhesive properties is a carboxyl group and/or carboxylic anhydride group-containing polymer.

10. The adhesive composition as claimed in claim 9, wherein said water soluble or water dispersible polymer having adhesive properties which is a carboxyl group and/or carboxylic anhydride group-containing polymer contains from about 10 to about 100 mol% of carboxyl and/or carboxylic anhydride group containing monomer, based on the total mols of monomer(s) used.

11. The adhesive composition as claimed in claim 1, wherein said water soluble or water dispersible polymer having adhesive properties is a cellulose derivative.

12. The adhesive composition as claimed in claim 1, wherein said water soluble or water dispersible polymer having adhesive properties is a starch derivative.

13. The adhesive composition as claimed in claim 1, wherein said organic solvent is mon-, di-, or tri-ethylene glycol mono-butyl ether, mono-, di-, or tri-ethylene glycol di-butyl ether, mono-, di-, or tri-ethylene glycol mono-ethyl ether, mono-, di-, or tri-ethylene glycol di-ethyl ether, mono-, di-, or tri-ethylene glycol monomethyl ether, mono-, di-, or tri-ethylene glycol dimethyl ether, mono-, di-, or tri-ethylene glycol monophenyl ether, mono-, di-, or tri-ethylene glycol di-phenyl ether, mono-, di-, or tri-ethylene glycol monobutyl ether acetate, glycerol, ethylene glycol, butanol, ethanol, propanol, or acetyltributyl citrate.

14. The adhesive composition as claimed in claim 1, wherein the proportion of said N-fatty acid acylated amino acid or a salt thereof in said adhesive composition is about 4 to 20% by weight.

15. The adhesive composition as claimed in claim 14, wherein the proportion of the compound having the polyoxyalkylene structure in the molecule in the adhesive composition is 4 to 20% by weight.

16. The adhesive composition as claimed in claim 15, wherein the proportion of said water soluble or water dispersible polymer having adhesive properties in the adhesive composition is about 15 to 35% by weight.

17. The adhesive composition as claimed in claim 16, wherein the proportion of said water or said mixture of water and one or more organic solvent(s) and/or one or more plasticizer(s) in the adhesive composition is about 40 to about 70% by weight.

18. The adhesive composition as claimed in claim 1, wherein said salt of the N-fatty acid acylated amino acid is the alkali metal salt, ammonium salt, or amine salt.

19. The adhesive composition as claimed in claim 1, wherein said composition contains said organic solvent together with water as the solvent component (d).

20. The adhesive composition as claimed in claim 1, wherein said composition contains said plasticizer together with water as the solvent component (d).

21. The adhesive composition as claimed in claim 1, wherein said water soluble or water dispersible polymer is a member selected from the class consisting of a copolymer of vinyl methyl ether and maleic anhydride, a copolymer of isobutylene and maleic anhydride, polyacrylic acid, polymethacrylic acid, a copolymer of styrene and acrylic acid or a copolymer of ethylene and acrylic acid.

22. The adhesive composition as claimed in claim 21, wherein said water soluble or water dispersible polymer having adhesive properties which is a carboxyl group and/or carboxylic anhydride group-containing polymer contains from about 10 to about 100 mol% of carboxyl and/or carboxylic anhydride group containing monomer, based on the total mols of monomer(s) used.

23. The adhesive composition as claimed in claim 1, wherein said water soluble or water dispersible polymer having adhesive properties is a member selected from the group consisting of a vinyl pyrrolidone/vinyl acetate copolymer, polyvinyl acetate, polyvinyl methyl ether, polyvinyl pyrrolidone and polyvinyl alcohol.

24. The adhesive composition as claimed in claim 1, wherein said water soluble or water dispersible polymer having adhesive properties is starch or dextrin.

* * * * *